US008125748B2

(12) United States Patent
Zheng

(10) Patent No.: US 8,125,748 B2
(45) Date of Patent: Feb. 28, 2012

(54) GROUND FAULT CIRCUIT INTERRUPTER

(75) Inventor: Chun Kai Zheng, Yueqing (CN)

(73) Assignee: Zhejiang Kedu Electric Mfg. Co. Ltd., Zhejiang (CN)

( * ) Notice: Subject to any disclaimer, the term of this patent is extended or adjusted under 35 U.S.C. 154(b) by 636 days.

(21) Appl. No.: 12/274,313

(22) Filed: Nov. 19, 2008

(65) Prior Publication Data

US 2009/0147416 A1 Jun. 11, 2009

Related U.S. Application Data

(60) Provisional application No. 60/989,159, filed on Nov. 20, 2007.

(51) Int. Cl.
*H02H 3/00* (2006.01)

(52) U.S. Cl. .......................................................... 361/42

(58) Field of Classification Search ..................... 361/42
See application file for complete search history.

(56) References Cited

U.S. PATENT DOCUMENTS 6,930,574 B2 * 8/2005 Gao ................................ 335/18
7,195,500 B2 * 3/2007 Huang et al. .................. 439/107

* cited by examiner

*Primary Examiner* — Stephen W Jackson
(74) *Attorney, Agent, or Firm* — Brian D. Smith, P.C.

(57) ABSTRACT

A ground fault circuit interrupter which comprises a main body structure, a low friction mechanical means, an electrical circuit, a low current utilizing solenoid, all of which are located in the main body structure for (1) interrupting the flow of electrical current in the interrupter when current flows from a live or neutral line to ground, (2) indicating an end-of-life condition in the interrupter, and (3) providing protection from reverse wiring of the interrupter.

4 Claims, 11 Drawing Sheets

GROUND FAULT CIRCUIT INTERRUPTER

BACKGROUND OF THE INVENTION

1. Field of Invention

The present invention relates to a ground fault interrupter for ground fault protection of persons using an electrical appliance. More particularly, the invention relates to GFCI receptacles utilizing a low friction pivotal latch, an end-of-life indicator and reverse wiring protection.

2. Description of Related Art

A ground fault occurs when current improperly flows through a ground line. Such a condition may indicate a shock hazard, even when the current flow is insufficient to trip a main breaker in the building in which the GFCI has been installed. Known ground fault circuit interrupters have been mounted in a receptacle housing with a detector to sense the ground fault condition. A ground fault is often detected by determining whether there is an imbalance in current between the two primary power lines. One or more toroidal coils can encircle the primary power lines to detect an imbalance in the currents in those lines. The imbalance can produce an output voltage from the toroidal coil to trigger a semiconductor circuit that energizes a solenoid coil. The solenoid coil drives an armature to release a latch that otherwise holds a pair of movable electrical contacts against a pair of stationary electrical contacts. When the movable contacts are released, power is disconnected from the terminals of the receptacle protected by the ground fault circuit interrupter (GFCI).

A GFCI generally includes a housing, a tripping means, a reset button, a test button, a mounting strap with a grounding strap and banding screw, a pair of movable contact holders with electrical contacts, a pair of fixed contact holders with electrical contacts, and a control circuit.

GFCIs are widely used to prevent electric shock and fire caused by a ground fault.

In the past, a GFCI receptacle generally utilized a mechanical actuator, which limited the performance of such products, especially insofar as these GFCIs did not provide reverse wiring protection. Examples of mechanical GFCIs include those disclosed in U.S. Pat. No. 5,935,063 and in U.S. Pat. No. 4,802,052.

The GFCI shown in published U.S. Patent Application No. 2006/0018062 A1 has reverse wiring protection that incorporates an electromagnetic tripping means and a corresponding control circuit. A significant disadvantage of this device is the relatively high mechanical resistance in initiating movement of a movable assembly of the device.

In addition, there is no end of life indicator in the above GFCIs which standard UL 943 now requires.

Accordingly, there is a need for a GFCI with an end of life indicator, reverse wiring protection, using a solenoid that easily overcomes frictional forces associated with a releasing latch means.

BRIEF SUMMARY OF THE INVENTION

It is an objective of the present invention to provide a GFCI having the above discussed needs.

In a preferred embodiment of the invention, a novel ground fault circuit interrupter includes a central body portion, an upper cover, a control circuit, latch means, and a mechanism for reverse wiring protection. The latch means has stationary arms with electrical contacts and terminals with electrical contacts. A movable bracket includes electrical contacts and a latch plate, a first solenoid coil for encircling a first armature located in a central body structure, and a reset button. The reset button has a latch pin and a press block engaging a second armature, the pin having return springs, all of which is located in the central body. The latch plate has two opposed cylindrical shafts that seat in two round recesses of the movable bracket that allows the latch plate to rotate pivotally in the round recesses. The upper end of the latch plate engages the latch pin of the reset button while the lower end of the latch plate has a vertical slot. One end of the first armature has a return spring while the other end has a narrow core and an impact step. The axial core of the armature seats in the vertical groove of the latch plate.

The mechanism for the reverse wiring protection includes a second solenoid coil encircling the second armature. One end of the armature has a return spring. The press block of the reset button presses against the second armature, while the end face of the armature engages an end wall of a support yoke.

The present invention includes an end of life circuit and indicator. If the GFCI fails, an LED is illuminated to tell the user that the GFCI is at or near the end of its life.

The present invention is also provided with reverse wiring protection that uses a mechanical means and a corresponding electrical control circuit. The control circuit is connected to the AC supply of the GFCI; it is de-energized when the GFCI is miswired by connecting the AC line to a load terminal (instead of a line terminal) so that the GFCI receptacle cannot be reset. When the GFCI is miswired, the face portion of the cover, particularly at the entry ports and the ground-prong-receiving opening, is without an electrical potential, which provides a safety feature for human use.

The latch plate of the invention is easy to rotate or pivot. The latch plate is easy to disengage by overcoming friction with a latch pin when the first armature strikes the latch plate such that the electrical power required for the second solenoid is relatively low. Thus, the electromagnetic device can be small, occupying less space within the body of the interrupter.

BRIEF DESCRIPTION OF THE DRAWINGS

The invention will be more readily understood by reference to the accompanying drawings wherein like reference numerals indicate like elements, and wherein reference numerals sharing the same last two digits identify similar corresponding elements throughout the various disclosed embodiments, and in which.

DETAILED DESCRIPTION OF PREFERABLE EMBODIMENT

Figure 1:
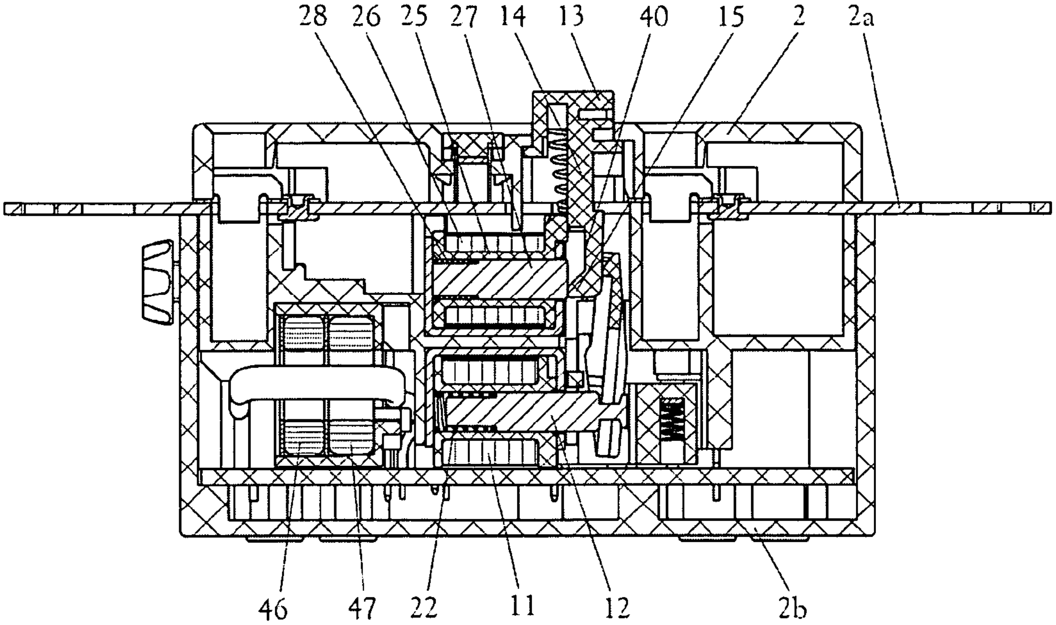
FIG. 1 is a longitudinal section of a GFCI constructed in accordance with principles of the present invention.
Figure 2:
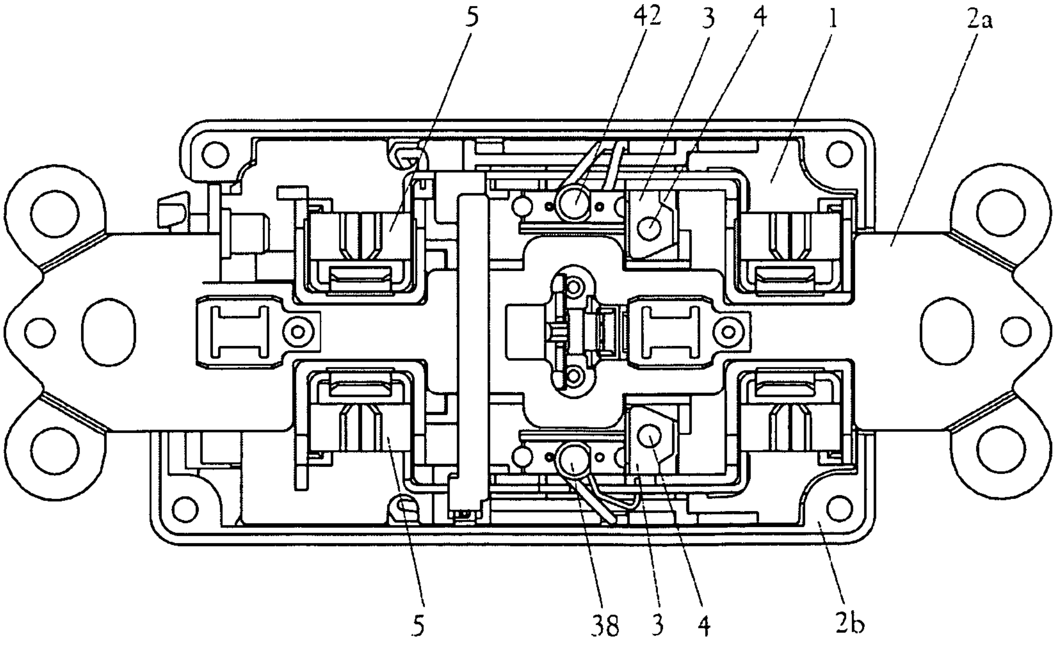
FIG. 2 is a top plan view of the GFCI of FIG. 1, with its cover removed.
Figure 3A:
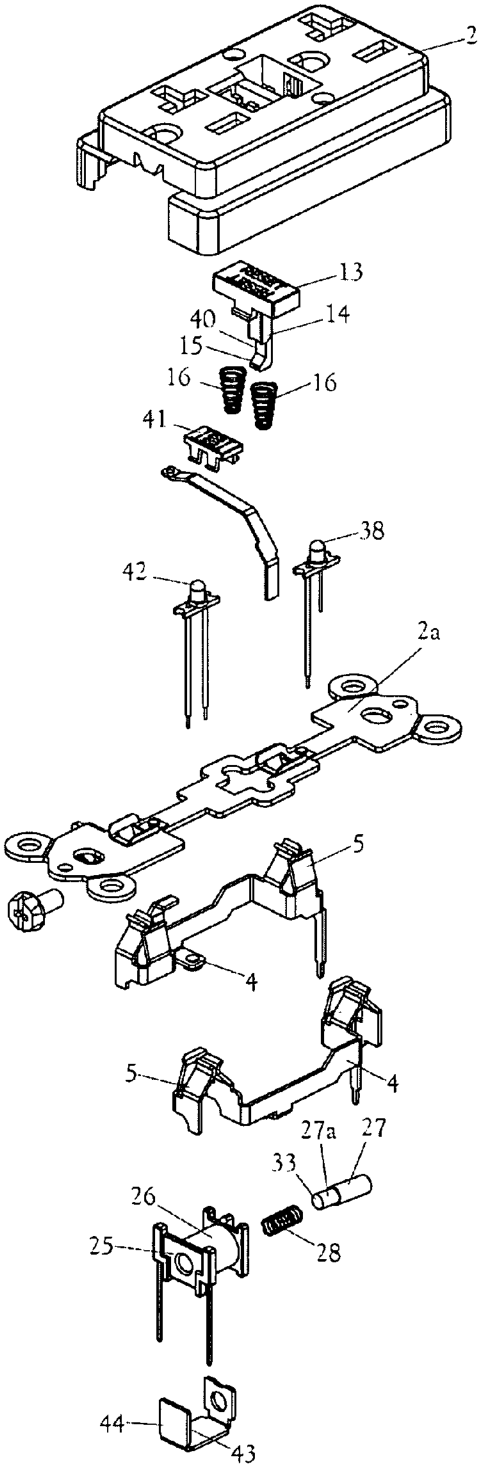
FIG. 3A and FIG. 3B are exploded views of the GFCI of FIG. 1.
Figure 8:
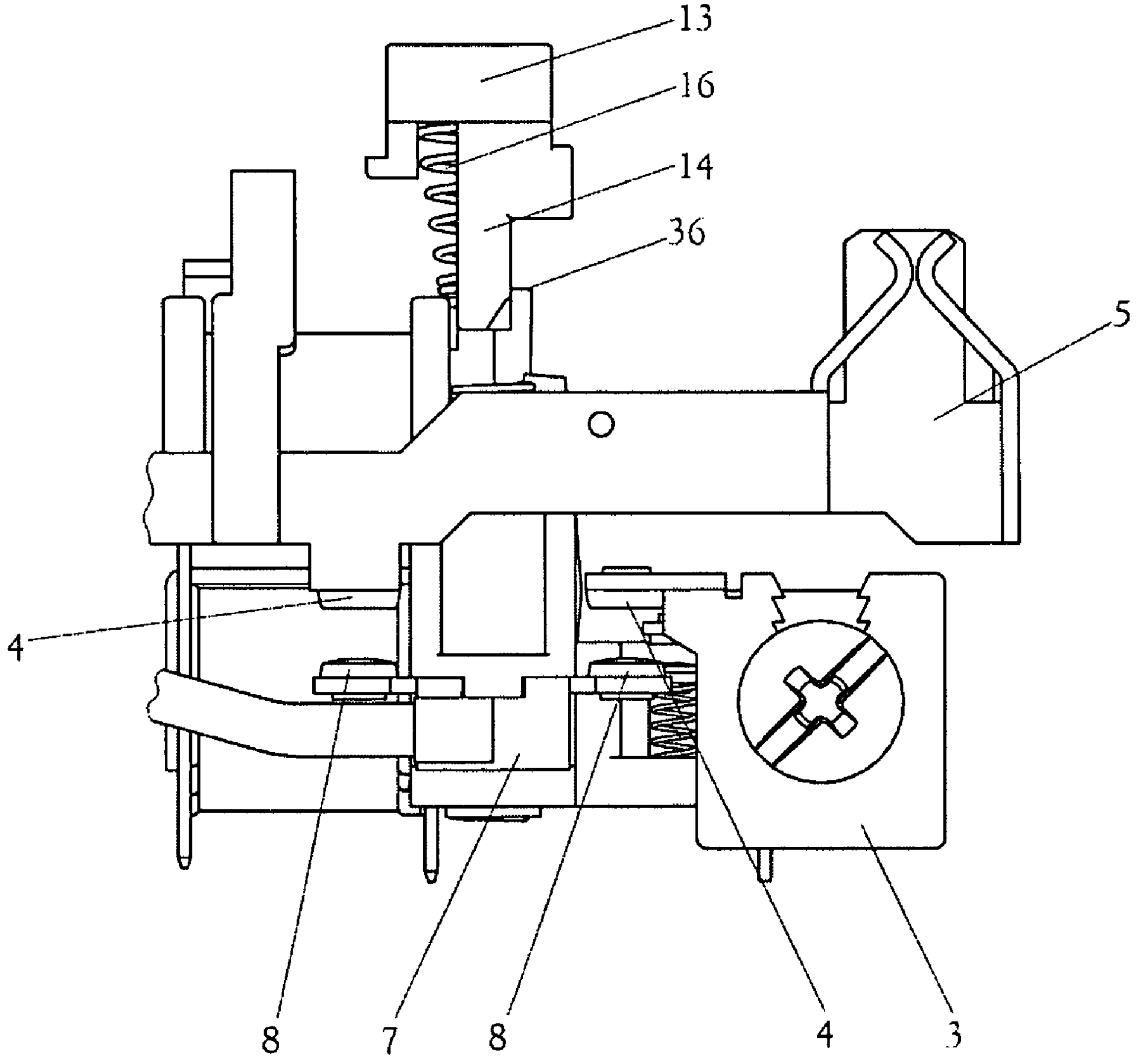
FIG. 8 is a side elevation view of stationary and movable electrical contacts in transit, said contacts being associated with stationary terminals and movable arms of the invention.

Referring now to FIG. 1 of the drawings, a sectional view of a duplex GFCI receptacle of the invention shows a central body 1 of the GFCI and an upper cover 2 suitably attached to the upper portion of the central body. FIG. 2 presents a plan view of the interior of body 1 from the top thereof, with upper cover 2 removed. A mounting strap 2*a* is visible and upper portions of blade receiving terminals 5 are therefore exposed. Stationary arms 3 having electrical contacts 4 are visible in body 1 (FIG. 2). A terminal 5, as depicted in FIG. 3A has a fixed contact 4 similar to that of arm 3. Terminal 5 is better seen in FIG. 8. A bottom cover 2*b* is shown in FIG. 3B that closes the lower face of central body 1.

Terminal 5 is one of two such terminals for receiving the male blades of an electrical plug (not shown) of an electrical appliance (not shown). Contacts 4 of the terminals 5 are located near one end of the terminals, as best seen in FIGS. 2 and 3A.

Figure 3B:
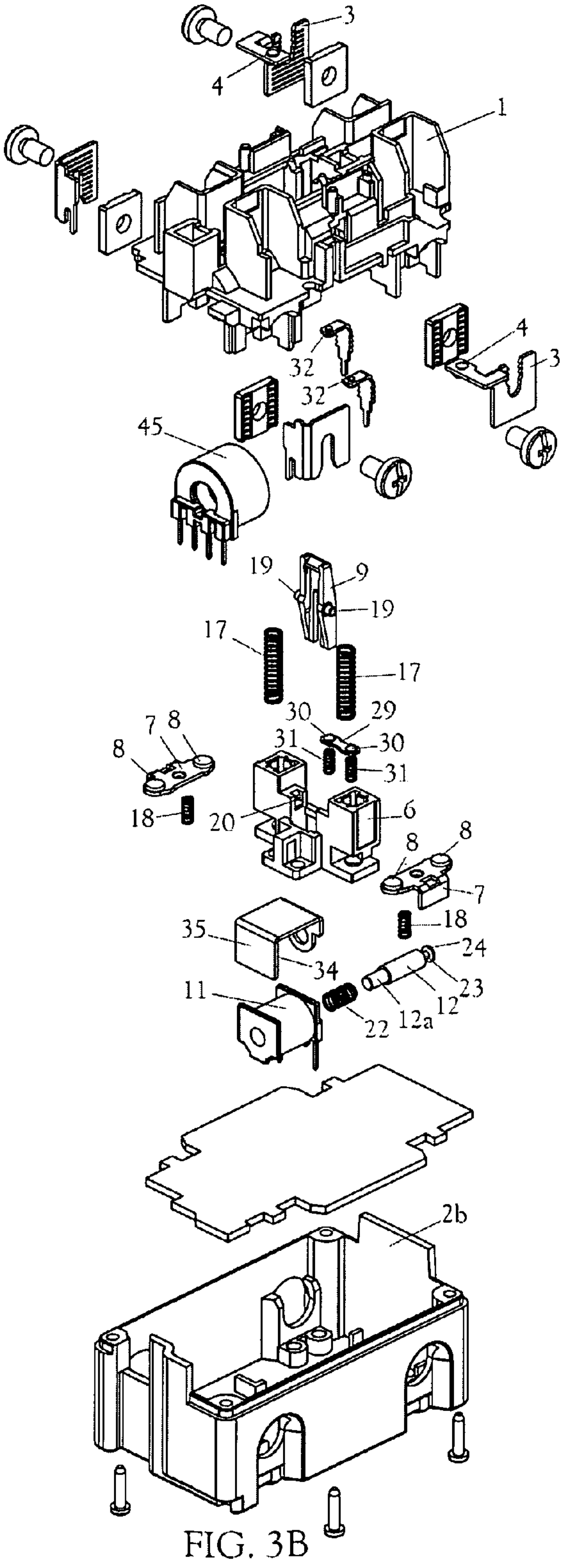
Figure 9:
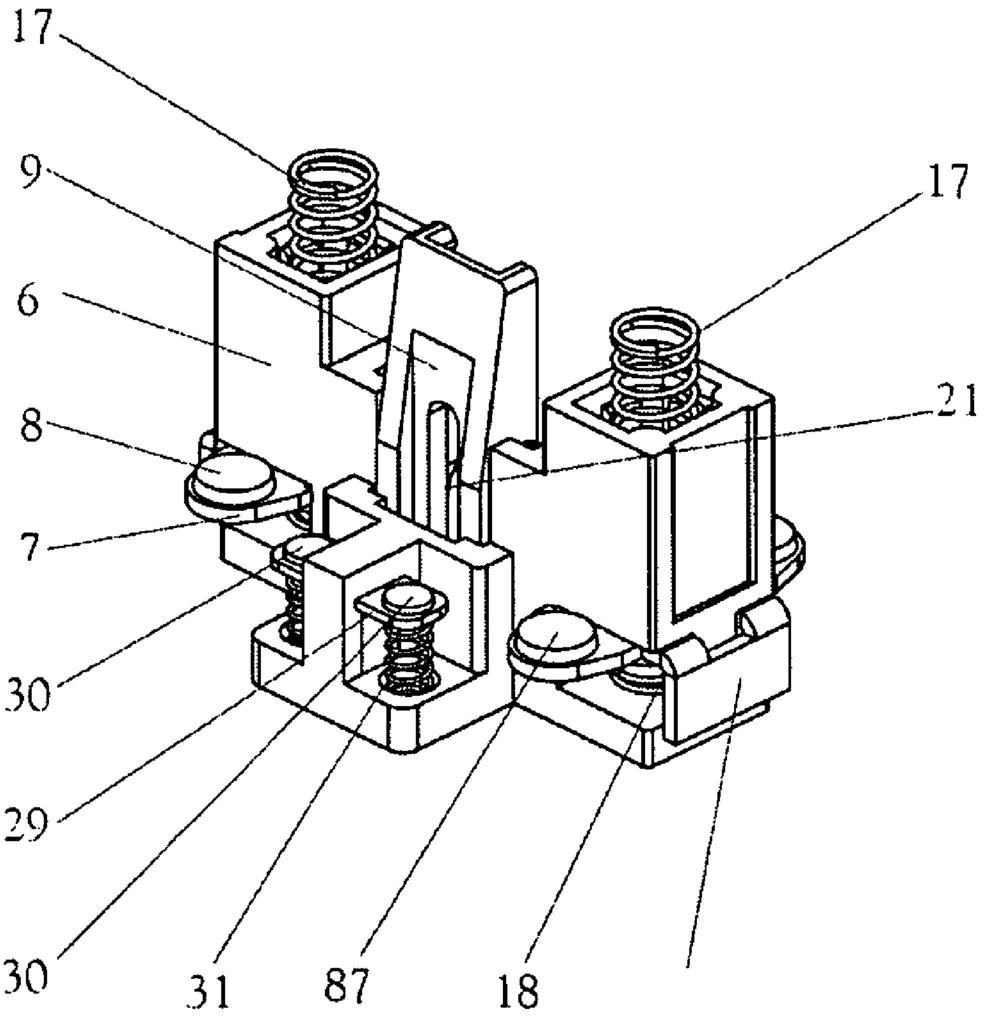
FIG. 9 is a perspective view of the movable bracket of the invention.
Figure 10:
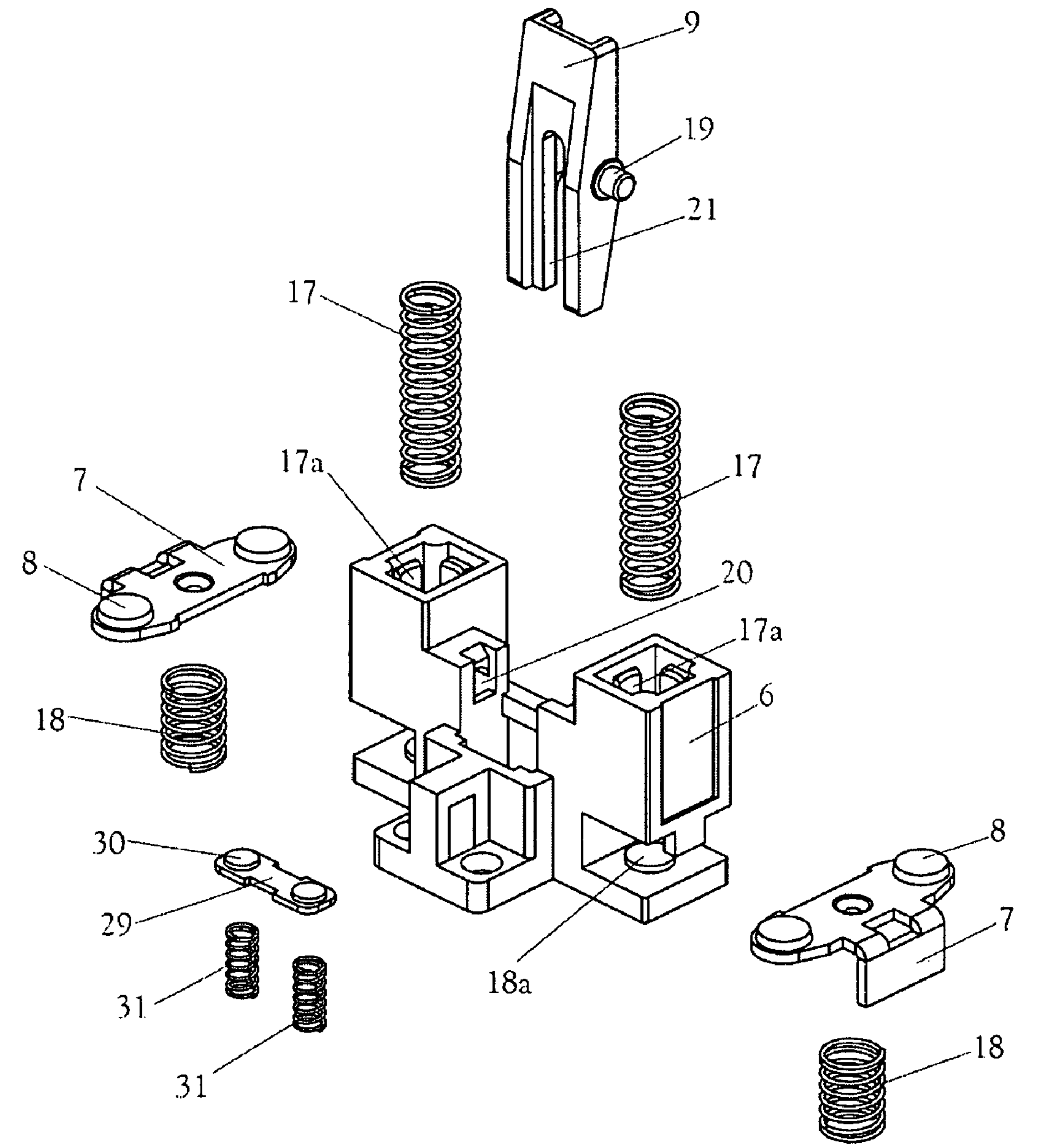
FIG. 10 is an exploded view of the bracket of FIG. 9.
Figure 11:
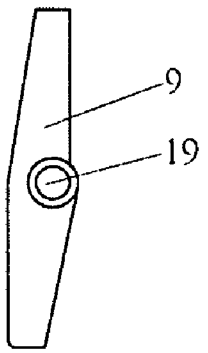
FIG. 11 is a side view of the latch plate of FIG. 1.
Figure 12:
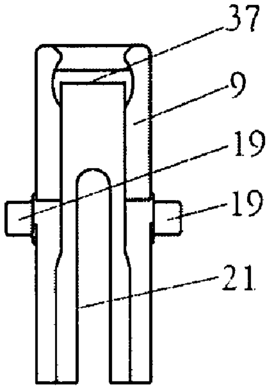
FIG. 12 is a front elevation view of the latch plate of FIG. 1.
Figure 13:
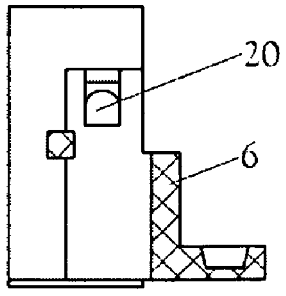
FIG. 13 is a side elevation view of the movable bracket of FIGS. 3B and 4.
Figure 14:
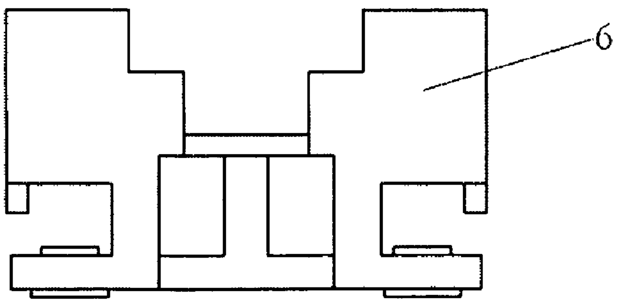
FIG. 14 is a front elevation view of the movable bracket of FIGS. 3B and 4.

FIGS. 3B, 9 and 10 show a movable bracket 6 of a latch means 10 of the invention containing movable arms 7 supporting electrical contacts 8, and a low friction, pivotal latch plate 9, discussed in detail hereinafter. A solenoid coil 11 with an axially movable armature 12 is located near bracket 6 and latch plate 9, as seen in FIG. 4.

FIGS. 4 to 8 show a reset button 13 having a downwardly extending latch pin 14, and a press block 15 located at the distal end of the latch pin. Return springs 16 are located beneath lateral portions of reset button 13.

Figure 4:
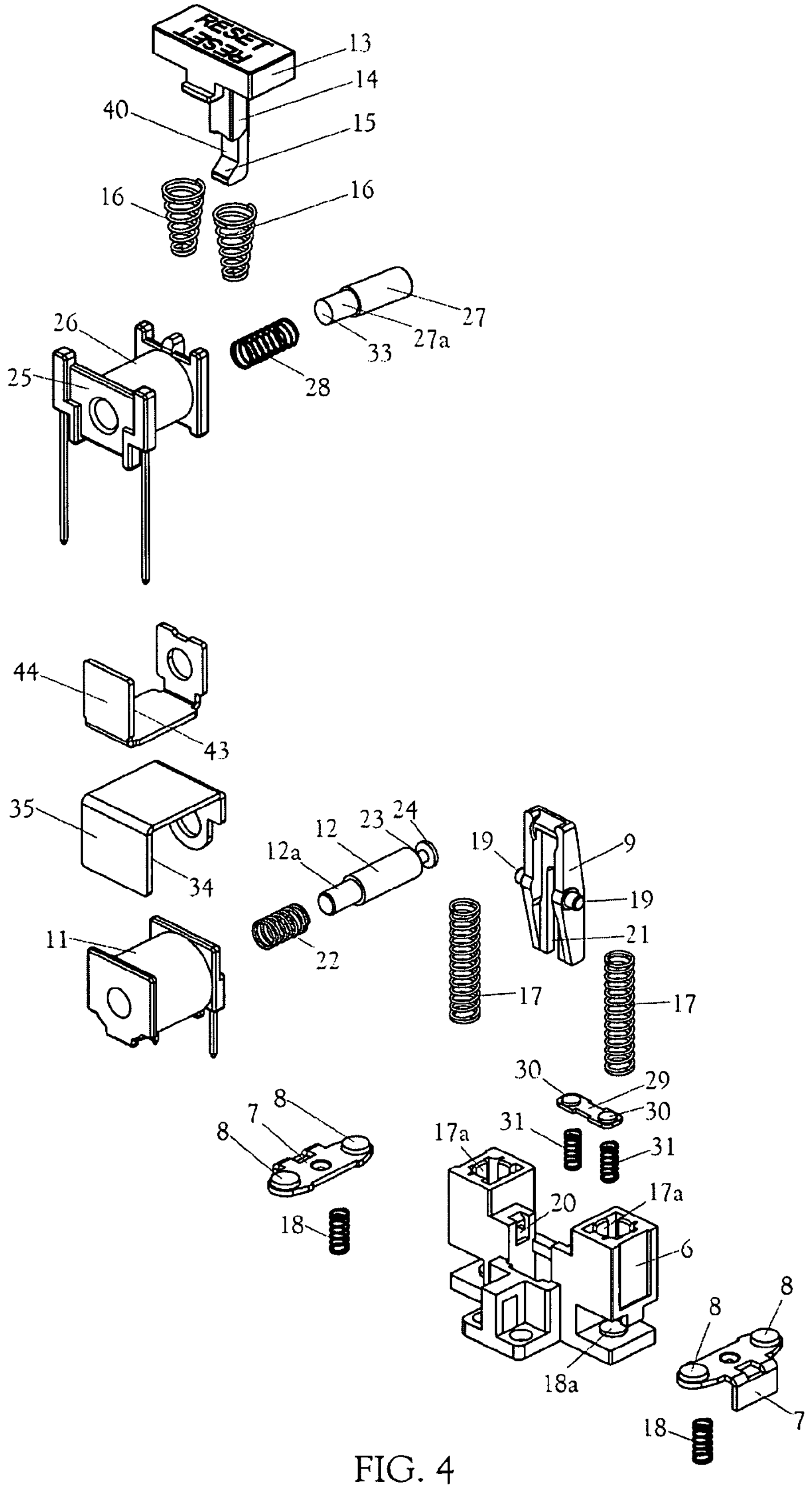
FIG. 4 is an exploded view of two solenoids and a portion of a latch means of FIG. 1.

Return springs 17 for bracket 6 seat into openings 17*a* provided in the bracket as indicated in FIG. 4 of the drawings, while movable arms 7 are provided with extension springs 18 that seat beneath arms 7 that support electrical contacts 8, as best seen in FIGS. 9 and 10, and are supported on portions of bracket 6 labeled 18*a* in FIGS. 4 and 10. The upper ends of springs 17 are received into hollow portions (not shown) provided in central body 1.

As seen in FIGS. 3, 4, 10 and 12 of the drawings, latch plate 9 has short, opposed shafts 19 that seat in opposed openings or recesses 20 provided in the body of bracket 6. Openings 20 have round surfaces for seating shafts 19 in a low friction manner. The short shafts 19 of latch plate 9 are made of any low friction material to insure easy rotation of the plate, thus requiring a minimum force to rotate the plate.

Figure 5:
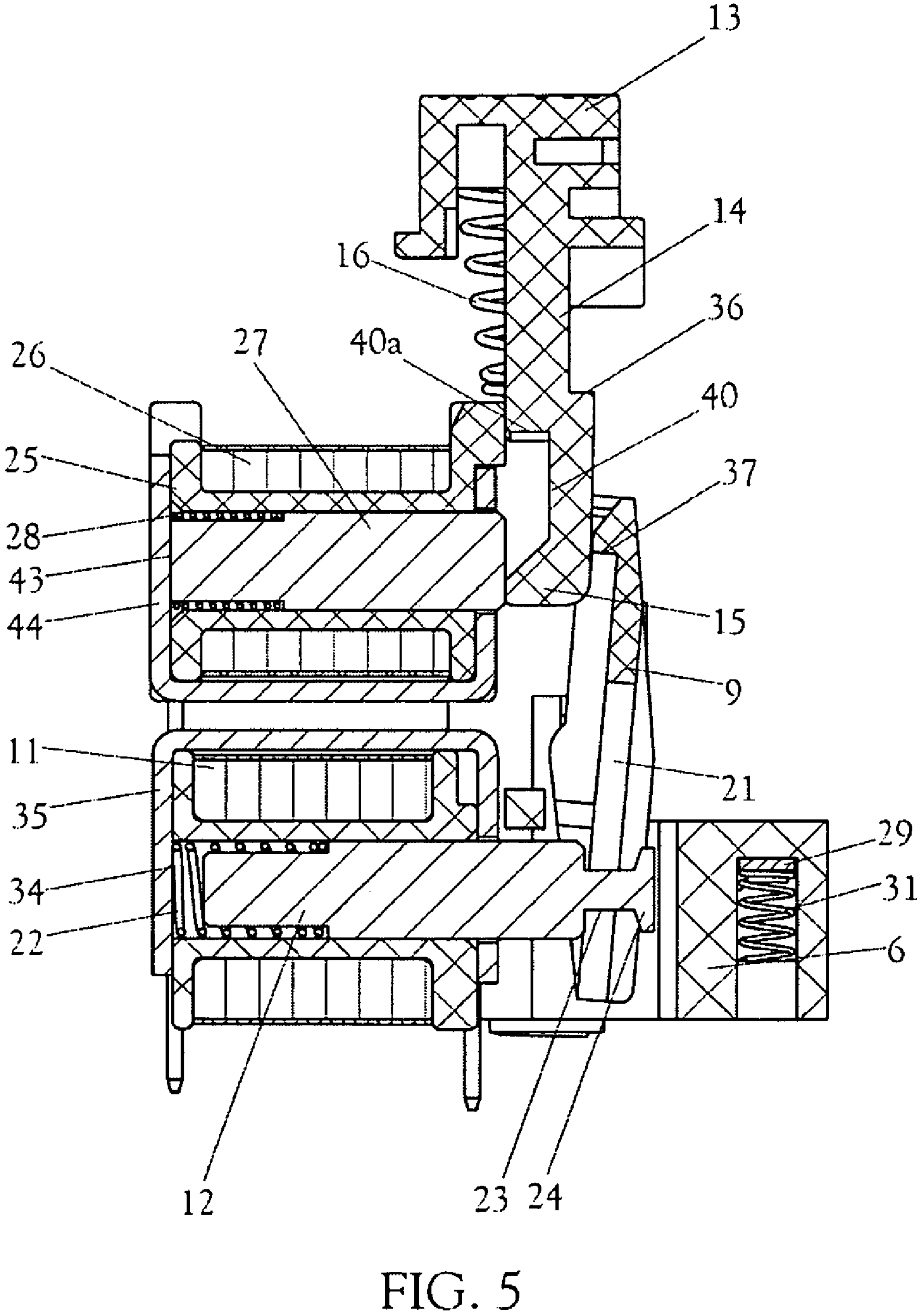
FIG. 5 is a sectional view of the solenoids of FIG. 4 located in close parallel proximity to each other, and the latch means of FIG. 1 showing an initial position.
Figure 6:
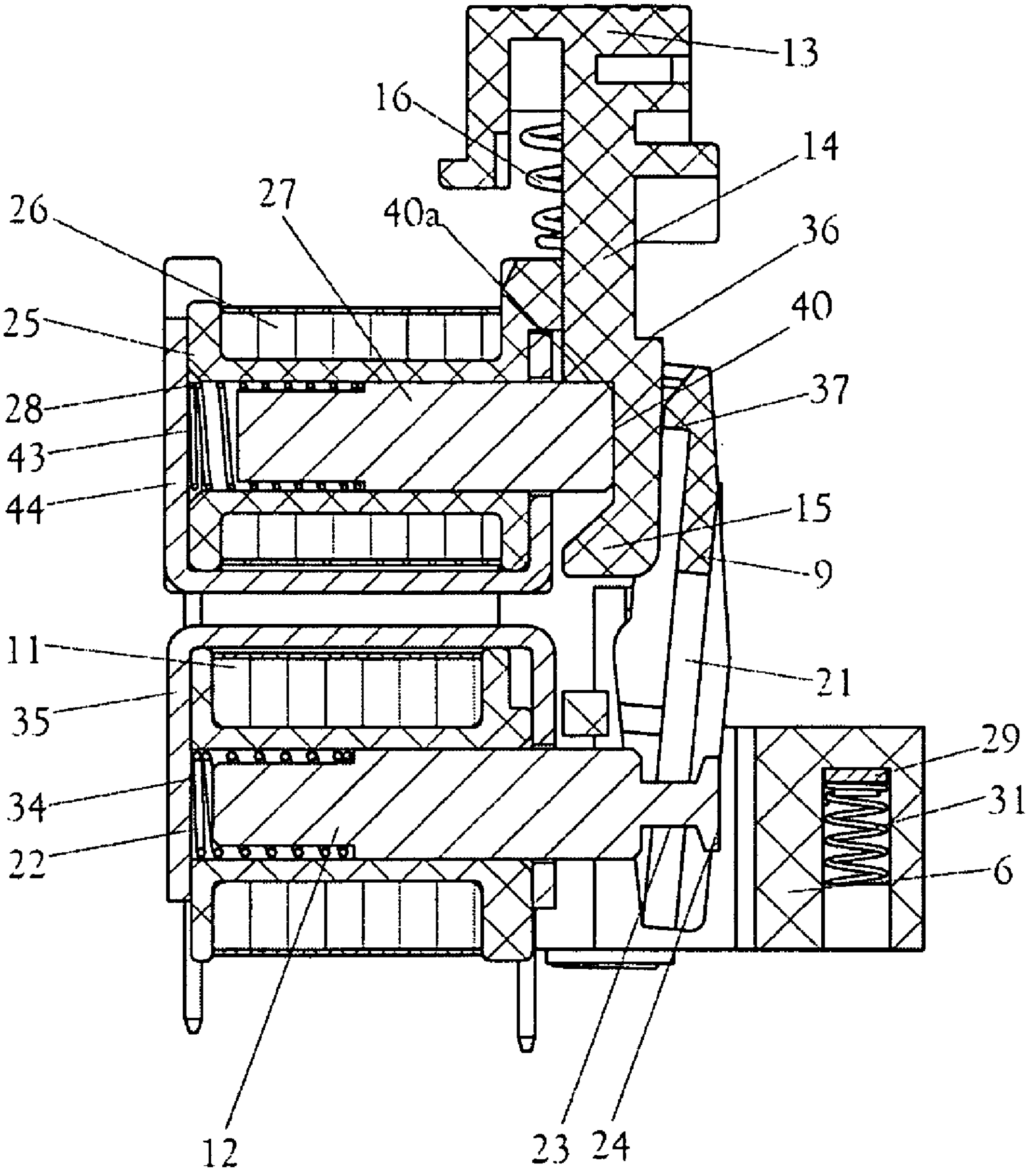
FIG. 6 is the sectional view of FIG. 5, with the latch means in a position that prevents resetting of the GFCI when it is miswired by connecting a power line to a load terminal or is not wired at all.
Figure 7:
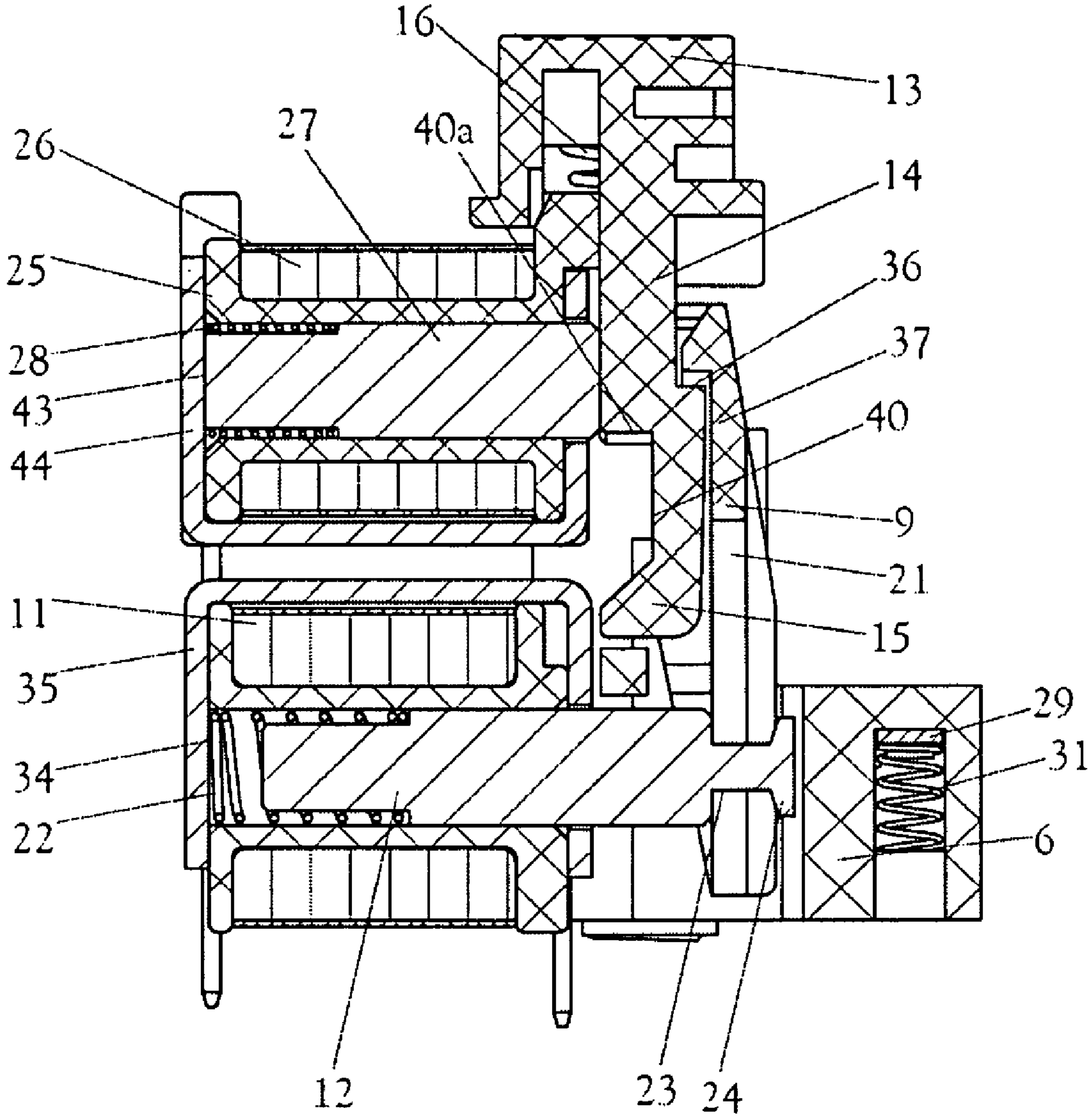
FIG. 7 is yet another sectional view of the solenoids and latch means showing a reset shaft in latched engagement with a pivotal latch plate.

Further, latch plate 9 has a narrow slot 21 that receives a narrow end 23 of armature 12, while the other end of the armature retains a return spring 22 between a shoulder 12*a* and the rear wall 34 of a first yoke 35, all of which is best seen in FIGS. 5 to 7 of the drawings. The armature, in addition, has an integral impact step 24 that is larger than the width of slot 21, and is located behind slot 21 so that the armature can engage latch plate 9 to rotate it about its shafts 19 when solenoid coil 11 is energized and de-energized.

The GFCI of the invention has, in addition, a mechanism for reverse wiring protection in the form of a second solenoid coil 26 having an armature 27 and a return spring 28. The spring is held between a shoulder 27*a* of the armature and the rear wall 43 of a second yoke 44. In FIGS. 5 to 7, the first and second yokes 35 and 44 are depicted in section to show assembled retention of the two solenoid coils 11 and 26, return springs 22 and 28, and armatures 12 and 27.

A second set of contacts 30 and 32 are shown in FIGS. 3B, 9 and 10. Contacts 30 are mounted on an arm 29 which is held in place in bracket 6 by two springs 31, see FIG. 9.

Figure 15:
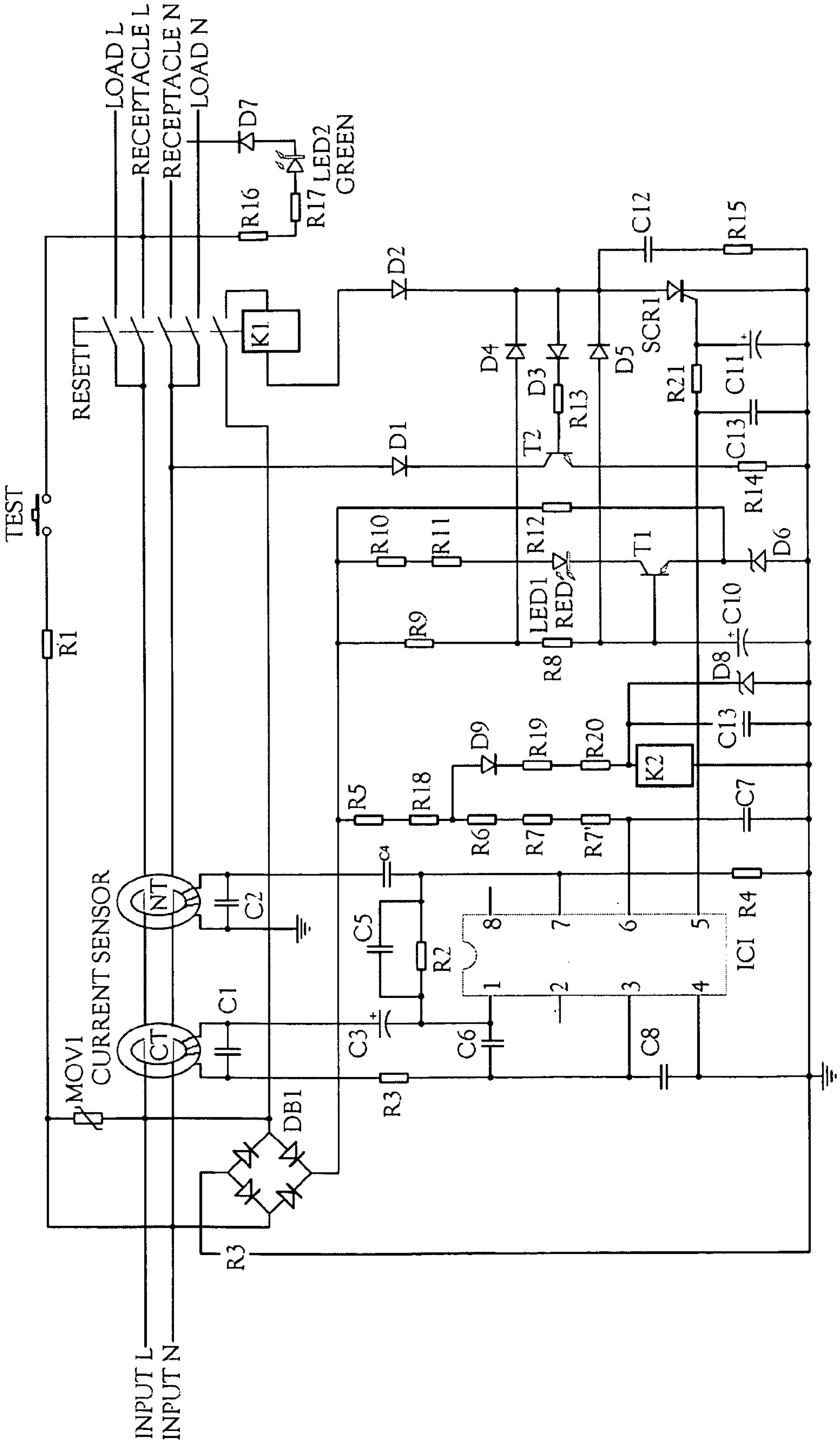
FIG. 15 is a schematic circuit diagram for controlling the GFCI of the present invention.

Latch pin 14 of reset button 13 is provided with a ledge 36 on a surface of the pin facing latch plate 9, see FIGS. 5 to 7. Similarly, the latch plate has a ledge 37 facing ledge 36 of latch pin 14. This structure of the latch system in cooperation with solenoid coil 26 and armature 27 provides reverse wiring protection as follows:

When the GFCI is connected to the AC power leads, the control circuit of FIG. 15 in the GFCI is energized. However, if the GFCI is reverse wired by connecting an AC power lead to a load terminal of the GFCI, or if the GFCI is not electrically connected, the control circuit is not energized since the power lead is not properly connected. Obviously, if a load lead is connected to a power terminal, no electrical power is available for the GFCI and its control circuit. With no power for solenoid 26, there is no translating force for its armature 27. The armature moves to the right in FIG. 1 under force of its return spring 28, and firmly seats in a recess 40 of the pin, as seen in FIG. 6. Latch pin 14 has a lower face or ledge 40*a* that prevents downward movement of the reset button so that the GFCI cannot be reset until the reverse wiring connection is corrected, thereby achieving reverse wiring protection. When the GFCI is electrically connected correctly, solenoid coil 26 is energized to translate its armature 27 from latch pin 14, so that reset button 13 and latch pin 14 can move downwardly a substantial distance. This allows latch plate 9 to seat over ledge 36 of latch pin 14 (see FIG. 7). Reset button 13 is free to move upwardly under the pressure of its return springs 16, and, as it moves upwardly, it moves bracket 6 upwardly. Electrical contacts 4 and 8 and 30 and 32 close to energize the GFCI.

With reset button 13 in a released position, return springs 16 maintain latch pin 14 in an upward position. This allows upward movement of latch plate 9, bracket 6 and contact arm 29 a distance sufficient to bring contacts 30 into electrical contact with stationary contacts 32 (FIG. 3B). After the engagement of contacts 30 and 32, contacts 8 on movable arms 7 come into contact with fixed contacts 4 on arms 3 and terminals 5 (FIGS. 3A and B).

FIG. 15 illustrates the control circuit. DB1 is a bridge rectifier that provides DC voltage to an integrated circuit amplifier IC1 and solenoids K2, K1 (26 and 11). CT and NT are current sensing transformers. If the current flowing in the input line L is not equal to the input neutral N, residual magnetic flux flows in the cores of the current sensing transformers (generally indicated by numeral 45 in FIGS. 3B and 15). An induced voltage appears at the secondary of the CT and is sent to a terminal 1 of the IC1 via C3 and R3. Solenoid K2 (26), D9, R19, R20, C13 and D8 are used for anti-reversing the line and load terminals of the GFCI. When applying voltage correctly at the input line and neutral terminals, the solenoid K2 (26) is energized by the current that flows through D9, R19 and R20. Now the RESET button 13 can be pushed down and power is transferred to the load and the receptacle terminals and to R16 and R17. LED2 and D7 are in series and connect between lines L and N. When the ground fault circuit interrupter is reset successfully, LED2 lights in green. If power is connected to the load L and N terminals, solenoid K2 (26) cannot be energized because no current flows through K2. The GFCI cannot be reset successfully so no power will be transferred to the input L and N terminals.

Connected between terminals 1 and 7 of the IC1 circuit is a resistive-capacitive circuit consisting of capacitor C5 and resistor R2. These components set the gain of the IC1 amplifier.

MOV1 is a metal oxide varistor. It is connected between the input Line and Neutral, and can absorb inrush current coming from the power supply.

C1 and C2 are two capacitors that are connected in parallel with the CT and NT. They oscillate, respectively, with the inductance of the CT and NT to preserve loop gain for oscillation.

C4 is a coupling capacitor; it transfers ground neutral fault signals to the IC1 from the CT.

Capacitors C6, C7 and C8 are filters that clean noise for pin1, pin6 and pin3 of the IC1.

R4 is a resistor employed for detecting a ground neutral fault with the NT, capacitor C2 and the IC1.

R5, R18, R6, R7 and R7' are voltage dividing resistors; they can produce an approximately 26VDC voltage to the IC1.

R8 and R9 are upper bias resistors for a transistor T1 connected between an LED1 and a diode D6.

R10 and R11 are two current limiting resistors for LED1. When the LED1 is switched on by transistor T1, current flows through R10, R11 and LED1. Resistors R10 and R11 provide an appropriate current for LED1. Otherwise too large a current would damage LED1.

Resistor R12 and diode D6 provide a reference voltage for the emitter of T1.

Resistor R13 is in series with the base of T1 and produces driving current for T1.

Resistor R14 is the load for a transistor T2. When T2 is switched on, an imitated leakage current flows through it.

Resistor R15 and capacitor C12 are in series with and are connected between the cathode and anode of an SCR1; R15 and C12 can absorb surge voltages appearing on SCR1.

Diode D2 is connected in series with the solenoid K2 so that current can only flow in the positive half cycle of the AC power. In every negative half cycle of the power, an imitation leakage current flows through the power neutral, D1, T2, R14 and the power line; the SCR1 is switched on by a trip signal sent out from the IC1, but now the diode D2 is anti-biased so that no current can flow through the solenoid K1 at that time. In the positive half cycles of the power, no limitation ground fault occurs, so the GFCI cannot be tripped and stays in its "Reset" state. But if an actual ground fault occurs, the SCR1 can be tripped to "on" condition in both half cycles of the AC power. At the positive half cycle, current can flow through solenoid K1, and the GFCI would trip immediately.

Diode D4 transfers a DC voltage from resistor R9 to the base of transistor T2 through diode D3 and resistor R13. Diode D4 prohibits the flow of current in the reverse direction.

Diode D3 is connected in series with resistor R13 and the base of transistor T2, it can protect T2 from damage by providing a high collector voltage.

Pin 3 of the IC1 provides an output 13V reference potential. Pin 2 is a positive input of an internal operational amplifier, and is connected to pin 3 of an internal 10K ohm resistor to produce the 13V reference. Pin 6 of the IC1 is its supply (26VDC) input pin.

During each half cycle of the power supply, transistor T2 turns on. But only in the negative half cycle, a simulated leakage current can flow from input neutral to input line via D1, T2, R14 and DB1. The line and neutral wires pass through the center of the current sensing transformer CT and the flow of different currents are now assumed to be a fault current. So an inducting voltage is produced at the secondary of the sensing transformer and fed to IC1, and IC1 produces a trip pulse at its pin5 to turn SCR1 on via resistor R21. A capacitor C10 now has a discharge path through D5 and SCR1 so that the base of transistor T1 remains at a low level and the end of life indicator LED1 remains off.

When components of the GFCI lose proper functioning or are at the end of their life, especially the sensing transformer CT, the integrated amplifier IC1 or the SCR1, as the imitated leakage current occurs through D1, T2 and R14 at any negative half cycle of the power supply, SCR1 cannot be tripped in its "on" state, capacitor C10 has no discharge path, the base voltage level of transistor T1 rises to a high level and remains that way so that transistor T1 turns on. The end of life indicator 42 (LED1) now gives off a red light, telling the user that the GFCI is at the end of its life and should be replaced by a new one.

LED1 and LED2 (numbered 42 and 38) are shown visible on the front face of the GFCI in FIG. 2 for easy viewing.

Since the lower end (press block 15) of the latch 14 presses against one end of armature 27 while the other end of the armature is disposed against the end structure 43 of yolk 44, only a small electromotive force is needed to prevent the armature from moving to the right (in FIGS. 1, 5, 6 and 7); thus a minimum amount of current needs to be utilized by solenoid 26 in returning the armature against the force of return spring 28.

When the GFCI is working properly, pressing of test button 41 provides a simulated leakage voltage from load point L (FIG. 15) across resistor R1 to the input point N. The IC1 circuit will sense a trip pulse and switch on SCR1, which will energize solenoid K1 (11) to disconnect contacts 4 and 8, and 30 and 32.

While the subject invention has been described in terms of a preferred embodiment, the claims appended hereto are intended to encompass all embodiments which fall within the spirit and scope of the invention.

What is claimed is:

1. A ground fault circuit interrupter comprising a main body structure, a low friction mechanical means, an electrical circuit, a low current utilizing solenoid, all of which are located in the main body structure for (1) interrupting the flow of electrical current in the interrupter when current flows from a live or neutral line to ground, (2) indicating an end-of-life condition in the interrupter, and (3) providing protection from reverse wiring of the interrupter, said low friction mechanical means including a latch plate having two opposed shafts, and a movable bracket having opposed recesses for receiving the opposed shafts, said solenoid including an armature, and a latch pin having a recess for receiving one end of said armature when electrical power is removed from the solenoid, said movable bracket containing electrical contacts, and said main body structure containing fixed electrical contacts, and a second solenoid having an armature mechanically engaging the latch plate, said electrical contacts of the movable bracket controlling the operation of the second solenoid.

2. The interrupter of claim 1 wherein the armature of the second solenoid is provided with a narrow core, said latch plate having a narrow slot for receiving the narrow core of the second solenoid.

3. The interrupter of claim 1 in which the latch pin and latch plate have opposed steps that engage each other when the latch pin is manually pushed inwardly in said main body structure to an inward portion, said step holding the latch pin in said inward position.

4. The interrupter of claim 2 in which the armature of the second solenoid is provided with an impact step located behind the latch plate a certain distance to allow rapid movement of the armature before engaging the latch plate.

* * * * *